(12) United States Patent
Michie et al.

(10) Patent No.: US 11,574,046 B2
(45) Date of Patent: Feb. 7, 2023

(54) PROTECTING A SOFTWARE PROGRAM AGAINST TAMPERING

(71) Applicant: VERIMATRIX, Meyreuil (FR)

(72) Inventors: Neal Michie, Bo'ness (GB); Chris Waddell, Glasgow (GB); Joonas Pylkkanen, Kerava (FI); Martin Bergenwall, San Diego, CA (US); Euan MacDonald, Glasgow (GB)

(73) Assignee: VERIMATRIX, Meyreuil (FR)

( * ) Notice: Subject to any disclaimer, the term of this patent is extended or adjusted under 35 U.S.C. 154(b) by 332 days.

(21) Appl. No.: 16/789,038

(22) Filed: Feb. 12, 2020

(65) Prior Publication Data

US 2020/0265135 A1    Aug. 20, 2020

(30) Foreign Application Priority Data

Feb. 18, 2019 (EP) ..................... 19157739

(51) Int. Cl.
*G06F 21/54* (2013.01)
*G06F 21/14* (2013.01)

(52) U.S. Cl.
CPC .............. *G06F 21/54* (2013.01); *G06F 21/14* (2013.01); *G06F 2221/033* (2013.01); *G06F 2221/0744* (2013.01)

(58) Field of Classification Search
CPC .............. G06F 21/14; G06F 2221/033; G06F 2221/0744; G06F 21/577; G06F 21/52
See application file for complete search history.

(56) References Cited

U.S. PATENT DOCUMENTS

| 5,991,399 A * | 11/1999 | Graunke | ............ | G11B 20/0021 |
| | | | | 713/168 |
| 6,233,687 B1 * | 5/2001 | White | ................ | G06F 21/6209 |
| | | | | 713/181 |
| 6,253,324 B1 * | 6/2001 | Field | .................. | H04L 63/0428 |
| | | | | 713/188 |

(Continued)

FOREIGN PATENT DOCUMENTS

| WO | 2004055634 A2 | 7/2004 |
| WO | 2009044129 A1 | 4/2009 |

OTHER PUBLICATIONS

European Search Report for Application No. 19157739.4. dated Aug. 13, 2019, 7 pages.

*Primary Examiner* — David Garcia Cervetti
(74) *Attorney, Agent, or Firm* — Brake Hughes Bellermann LLP (57) ABSTRACT

In a general aspect, a method of protecting a software program against tampering can include: executing, by a processor of a user device, an executable code of the software program, the executable code comprising integrity check code sections; during execution of one of the integrity check code sections of the executable code, computing by the processor an integrity check result applied to a code segment of the executable code; transmitting by the processor to a server a message containing the integrity check result and an identifier of the code segment; and when the integrity check result does not correspond to a reference result for the code segment of a genuine version of the software program, receiving by the processor from the server a signal that prevents an operation of the software program from being executed by the processor.

22 Claims, 3 Drawing Sheets

(56) References Cited

U.S. PATENT DOCUMENTS

| | | | | |
|---|---|---|---|---|
| 6,681,329 B1* | 1/2004 | Fetkovich | G06F 21/52 | 713/193 |
| 7,080,249 B1* | 7/2006 | Jakubowski | G06F 21/125 | 713/181 |
| 7,587,763 B2* | 9/2009 | Yodaiken | G06F 21/52 | 709/224 |
| 7,739,514 B2* | 6/2010 | Bangui | H04L 63/123 | 713/181 |
| 7,873,955 B1* | 1/2011 | Sebes | G06F 21/566 | 717/168 |
| 7,953,391 B2* | 5/2011 | Lee | H04L 9/3273 | 713/180 |
| 8,239,686 B1* | 8/2012 | Hodzic | G06F 21/52 | 713/187 |
| 8,271,803 B2* | 9/2012 | Goldsmid | G06F 21/125 | 713/190 |
| 8,285,999 B1* | 10/2012 | Ghose | H04L 9/3271 | 713/180 |
| 8,364,973 B2* | 1/2013 | Khosravi | G06F 21/64 | 726/22 |
| 8,402,520 B1* | 3/2013 | Painter | G06F 21/445 | 726/5 |
| 8,429,469 B2* | 4/2013 | Korkishko | G06F 21/645 | 714/719 |
| 8,479,186 B2* | 7/2013 | Jogand-Coulomb | G06F 21/10 | 726/8 |
| 8,667,555 B1* | 3/2014 | Erickson | H04L 63/12 | 713/168 |
| 8,782,435 B1* | 7/2014 | Ghose | G06F 21/52 | 712/216 |
| 8,909,931 B2* | 12/2014 | Noda | H04L 9/0897 | 713/168 |
| 9,106,426 B2* | 8/2015 | Schneider | H04L 63/0846 | |
| 9,111,099 B2* | 8/2015 | Paris | G06F 21/57 | |
| 9,177,153 B1* | 11/2015 | Perrig | G06F 21/57 | |
| 9,536,088 B1* | 1/2017 | Igotti | G06F 21/554 | |
| 9,680,824 B1* | 6/2017 | Rodgers | H04L 61/5014 | |
| 9,703,950 B2* | 7/2017 | Vandergeest | G06F 21/55 | |
| 9,710,293 B2* | 7/2017 | Sahita | G06F 21/51 | |
| 9,946,878 B2* | 4/2018 | Djabarov | H04L 9/30 | |
| 9,953,159 B2* | 4/2018 | Horne | G06F 3/0673 | |
| 11,245,523 B2* | 2/2022 | Vilmos | H04L 63/0281 | |
| 11,334,664 B2* | 5/2022 | Eells | G06F 21/52 | |
| 2002/0194580 A1* | 12/2002 | Ramasamy | G06F 11/3612 | 717/130 |
| 2003/0135740 A1* | 7/2003 | Talmor | H04L 9/3231 | 713/186 |
| 2003/0191942 A1* | 10/2003 | Sinha | G06F 21/52 | 713/181 |
| 2003/0204769 A1* | 10/2003 | Coughlin | H04L 69/40 | 714/4.12 |
| 2003/0226033 A1* | 12/2003 | Zinda | H04L 63/101 | 713/170 |
| 2004/0260980 A1* | 12/2004 | Ito | G06F 21/14 | 714/38.1 |
| 2005/0210287 A1* | 9/2005 | Paatero | G06F 21/85 | 726/5 |
| 2006/0085645 A1* | 4/2006 | Bangui | G06F 21/72 | 713/161 |
| 2006/0236122 A1* | 10/2006 | Field | G06F 21/575 | 713/187 |
| 2007/0005992 A1* | 1/2007 | Schluessler | G06F 21/54 | 713/181 |
| 2007/0143629 A1* | 6/2007 | Hardjono | H04L 63/0823 | 713/181 |
| 2007/0150857 A1* | 6/2007 | Korkishko | G06F 21/645 | 717/136 |
| 2007/0192761 A1* | 8/2007 | Sahita | G06F 21/53 | 717/140 |
| 2007/0285271 A1* | 12/2007 | Erlingsson | G06F 21/52 | 340/815.84 |
| 2008/0076547 A1* | 3/2008 | Bigelow | G06F 21/57 | 463/29 |
| 2008/0148061 A1* | 6/2008 | Jin | G06F 21/14 | 713/187 |
| 2008/0177998 A1* | 7/2008 | Apsangi | H04N 21/4753 | 713/165 |
| 2008/0250502 A1* | 10/2008 | Sole | G06F 21/51 | 726/23 |
| 2009/0138708 A1* | 5/2009 | Miyazaki | H04L 63/04 | 713/168 |
| 2009/0172814 A1* | 7/2009 | Khosravi | G06F 21/54 | 726/23 |
| 2009/0276857 A1* | 11/2009 | Harkness | G06F 21/57 | 726/26 |
| 2009/0327711 A1* | 12/2009 | Goldsmid | H04L 9/3236 | 713/165 |
| 2009/0328164 A1* | 12/2009 | Sunder | G06F 21/577 | 726/5 |
| 2010/0042824 A1* | 2/2010 | Lee | H04L 9/0844 | 713/168 |
| 2011/0041003 A1* | 2/2011 | Pattar | H04L 41/0681 | 714/E11.073 |
| 2011/0167261 A1* | 7/2011 | Fanton | G06F 21/44 | 713/165 |
| 2012/0151206 A1* | 6/2012 | Paris | H04L 63/08 | 726/5 |
| 2012/0260353 A1* | 10/2012 | Raley | H04N 21/632 | 726/29 |
| 2012/0266209 A1* | 10/2012 | Gooding | H04L 63/20 | 726/1 |
| 2012/0266252 A1* | 10/2012 | Spiers | H04L 63/08 | 726/26 |
| 2013/0086643 A1* | 4/2013 | Morgan | G06F 21/125 | 726/4 |
| 2013/0326215 A1* | 12/2013 | Leggette | G06F 21/604 | 726/10 |
| 2014/0024341 A1* | 1/2014 | Johan | G06F 21/105 | 455/411 |
| 2015/0040224 A1* | 2/2015 | Litva | H04L 63/1441 | 726/23 |
| 2015/0052603 A1* | 2/2015 | Morgan | H04L 63/1408 | 726/22 |
| 2015/0156024 A1* | 6/2015 | De Los Santos | H04L 9/3265 | 713/176 |
| 2015/0205949 A1* | 7/2015 | Iskin | G06F 21/64 | 726/22 |
| 2015/0358334 A1* | 12/2015 | Lantz | G06F 8/65 | 726/3 |
| 2016/0028549 A1* | 1/2016 | Yuji | G06F 21/57 | 713/176 |
| 2016/0055331 A1* | 2/2016 | Szczeszynski | G06F 21/14 | 726/22 |
| 2016/0119344 A1* | 4/2016 | Freitas Fortuna dos Santos | H04L 63/1466 | 726/7 |
| 2016/0162669 A1* | 6/2016 | Mikhailov | G06F 21/445 | 713/2 |
| 2016/0239364 A1* | 8/2016 | Nam | G06F 11/0751 | |
| 2016/0321656 A1* | 11/2016 | Rabinovich | H04L 63/0861 | |
| 2016/0371496 A1* | 12/2016 | Sell | G06F 12/14 | |
| 2017/0085578 A1* | 3/2017 | Ha | H04L 9/3234 | |
| 2017/0116410 A1* | 4/2017 | Wajs | G06F 8/70 | |
| 2017/0255779 A1* | 9/2017 | Caklovic | G06F 21/54 | |
| 2017/0256951 A1* | 9/2017 | Crespo-Dubie | H02J 3/381 | |
| 2017/0323120 A1* | 11/2017 | Anderson | G06F 21/51 | |
| 2018/0150338 A1* | 5/2018 | Markello | G06F 11/30 | |
| 2018/0349575 A1* | 12/2018 | Somsikov | G06F 21/14 | |
| 2019/0074962 A1* | 3/2019 | Ateniese | H04L 9/0816 | |
| 2019/0094371 A1* | 3/2019 | Biacs | G01S 19/20 | |
| 2019/0272162 A1* | 9/2019 | Couillard | H04L 9/088 | |
| 2019/0296961 A1* | 9/2019 | Kang | H04L 9/0637 | |
| 2019/0340379 A1* | 11/2019 | Beecham | H04L 9/3239 | |
| 2019/0349426 A1* | 11/2019 | Smith | H04L 67/10 | |
| 2020/0004952 A1* | 1/2020 | Rolin | G06F 21/565 | |
| 2020/0007342 A1* | 1/2020 | Liem | H04L 9/0637 | |
| 2020/0019288 A1* | 1/2020 | D'Amore | H04L 9/50 | |

(56) References Cited

U.S. PATENT DOCUMENTS

2020/0065480 A1* 2/2020 Gu .......................... G06F 21/64
2020/0219096 A1* 7/2020 Falk ........................ G06F 21/64
2021/0385090 A1* 12/2021 Prasad .................. H04L 69/324

* cited by examiner

PROTECTING A SOFTWARE PROGRAM AGAINST TAMPERING

CROSS REFERENCE TO RELATED APPLICATION

This application claims priority to European Application No. 19157739.4, filed Feb. 18, 2019, the disclosure of which is incorporated by reference herein in its entirety.

TECHNICAL FIELD

The present disclosure relates generally to the field of program security and to techniques for increasing the resistance of a software program to tampering. In particular, the present disclosure relates to methods and devices for protecting software programs against attacks that use reverse engineering or similar mechanisms to access and/or modify program code.

BACKGROUND

In releasing a software application for execution on end users' hardware, a program developer is effectively providing users a complete access to the program code of that application. Unfortunately, some users will attempt to compromise the software application in order for example, to obtain illegal copies, gain unlicensed access to certain features, steal intellectual property from the application, or inject malicious code. Indeed, free access to executable code by unauthorized users can often result in loss of intellectual property, and provide the user with an easy means for probing the application for security vulnerabilities. Also, application code may be modified after being reversed-engineered to remove metering or usage controls before being recompiled, resulting in a loss of revenue for the application publisher. Thus, the environment into which application publishers release their applications can be considered to be hostile. There is therefore a need to protect software programs from tampering or misuse, which may involve unauthorized modification or copy of the software program.

A number of anti-tamper techniques have been previously proposed for protecting software applications from being modified and/or copied. For example, it is known for software applications to utilize copy protection techniques or to insert encoded limitations into them, which, for example, require password or serial number access, prevent copying, or restrict the use of the application in some way.

Techniques for obfuscating software program code have also been proposed. Obfuscated code is a type of executable code, which is intentionally made very difficult to read and understand. Although obfuscated code can deter reverse engineering, there is still a possibility that the code could be read and understood, and therefore modified. As such, obfuscated code provides only low-level security means, and it is often necessary to use it in conjunction with additional security means, such as encryption. Additionally, common software reverse engineering attacks target copy protection schemes. These schemes generally rely on existing operating system procedure calls, making basic code obfuscation easily bypassed using the same tools used with unobfuscated code. Furthermore, obfuscated code is not only a problem for hackers but also for the software developers of the software applications themselves, as obfuscated code is inherently very difficult to debug. As a result, it is often necessary to maintain two versions of the same program code: an unobfuscated code version for debugging and an obfuscated code version for distribution. Due to the low level of security provided, this additional constraint is often considered to outweigh the benefits of obfuscation and therefore alternative methods are required.

Other known anti-tamper techniques are called "integrity checks". These techniques verify during runtime that the application code has not been tampered with, where tampering includes code and/or data modification, changes of the execution environment, or any other measure which changes the behavior of the application. For example, during its normal running, the application checks the integrity of its own code by computing one or more checksums (or hash or signature) of a part (target code) or all the application executable code. The results of these checksum computations are compared with expected values that are embedded within the application code. Such checking approach can be extrapolated by constructing an interconnected web of checks, such that any modification to the application code can be detected. These code integrity checks can be inserted into any existing program code. If a modification is detected by such an integrity check, a defensive action can be taken, such as calling a response function which exits the application or goes into an infinite loop. More generally the response function can be destructive when it prevents the application from being normally executed, or non-destructive when it leaves control back to the application.

However, some applications can be recompiled a trusted party other than the application providers, which changes the final form or executable code of the application. Generally the third party is not aware of the presence of integrity checks in the application or does not have a dedicated tool that can update the integrity check expected results in the application executable code. Therefore, such a recompilation of an application invalidates the integrity checks, as the checksum computed by one or more of the integrity checks can no more correspond to the expected results in the application code. Thus the application appears as being tampered with. More generally other authorized processes can alter a final or published form of an application without the consent or awareness of the application provider. For example, the application could be resigned or a manifest file could be embedded or modified in the application code.

Therefore, there is a need for a method of detecting a modification of an executable program code, which can distinguish between authorized and unauthorized modifications.

SUMMARY

A method is described for generating random numbers. The method may include method of protecting a software program against tampering, the method comprising: executing, by a processor of a user device, an executable code of the software program, the executable code comprising integrity check code sections; during execution of one of the integrity check code sections of the executable code, computing by the processor an integrity check result applied to a code segment of the executable code; transmitting by the processor to a server a message containing the integrity check result and an identifier of the code segment; and when the integrity check result does not correspond to a reference result for the code segment of a genuine version of the software program, receiving by the processor from the server a signal that prevents an operation of the software program from being executed by the processor.

According to an embodiment, the method further comprises comparing, by the processor, the integrity check result with a reference result stored for the code segment, the message being transmitted to the server only when the integrity check result does not correspond to the reference result stored for the code segment.

According to an embodiment, the method further comprises preventing by the processor an operation of the software program from being executed when the integrity check result does not correspond to the reference result stored for the code segment.

According to an embodiment, the reference result is received by the user device and inserted by the processor into the executable code when the executable code is executed by the processor at a first time.

According to an embodiment, the reference result is computed and inserted into the executable code when the executable code of the software program is generated.

According to an embodiment, the executable code of the software program is divided into code segments grouped together into sequences of code segments, each sequence comprising links between code segments, a root code segment and a last code segment, each link linking an originating code segment to a target code segment of the sequence, each link corresponding to an integrity check code section in the originating code segment of the link, which verifies integrity of the target code segment of the link.

According to an embodiment, the method further comprises determining by the server if the integrity check result computed for the code segment received from the user device corresponds to a reference result for a corresponding code segment of a genuine version of the software program.

According to an embodiment, the method further comprises: receiving by the server from other user devices, messages containing an integrity check result associated with an identifier of a code segment of the software program and an identifier of the user device; forming, by the server, result sets of integrity check results of instances of the software program, by grouping messages received from a same user device, each user device being considered as executing a single instance of the software program; counting, by the server, occurrence numbers of identified different results sets among the result sets, each identified different result set corresponding to a respective version of the software program; and deciding that one of the versions of the software program executed by a user device is genuine when the identified different result set corresponding to the version of the software program has an occurrence number exceeding a given threshold value after a given time from a first reception by the server of the identified different result set.

Some embodiments may relate to a device comprising a processor, a memory and communication circuits for connecting the processor to a remote server, the processor being configured to: execute an executable code of the software program, the executable code comprising integrity check code sections; during execution of one of the integrity check code sections of the executable code, compute an integrity check result applied to a code segment of the executable code; transmit to a server a message containing the integrity check result and an identifier of the code segment; and when the integrity check result does not correspond to a reference result for the code segment in a genuine version of the software program, receive from the server a signal that prevents an operation of the software program from being executed by the processor.

According to an embodiment, the processor is further configured to implement the method as above disclosed.

According to an embodiment, the device further comprises a protected memory area configured to receive the message when the device is not connected to the server.

According to an embodiment, the device further comprises a secure element configured to: establish secure links with the processor and with the remote server; receive and store the message from the processor; and transmit the message to the server upon request thereof.

According to an embodiment, the device further comprises a secure element configured to: establish secure links with the processor and with the remote server receive and store the reference results of the software program from the server; receive comparison requests from the processor; subsequent to receiving a comparison request, compare an integrity check result of a code segment, received in the comparison request, with one of the reference results stored by the secure element and corresponding to the code segment, and transmit to the processor a comparison result of the comparison; or transmit to the processor the reference result requested in the comparison request; generate and store a message containing the integrity check result; and receive requests from the remote server, and subsequent to receiving a request from the remote server, transmit the message to the server.

Some embodiments may relate to a computer program product loadable into a computer memory and comprising code portions which, when carried out by a computer, configure the computer to carry out the method as above disclosed.

BRIEF DESCRIPTION OF THE DRAWINGS

The methods and/or devices described herein may be better understood with reference to the following drawings and description. Non-limiting and non-exhaustive descriptions are provided with the following drawings. In the figures, like reference signs may refer to like parts throughout the different figures, unless otherwise specified.

DETAILED DESCRIPTION

Figure 1:
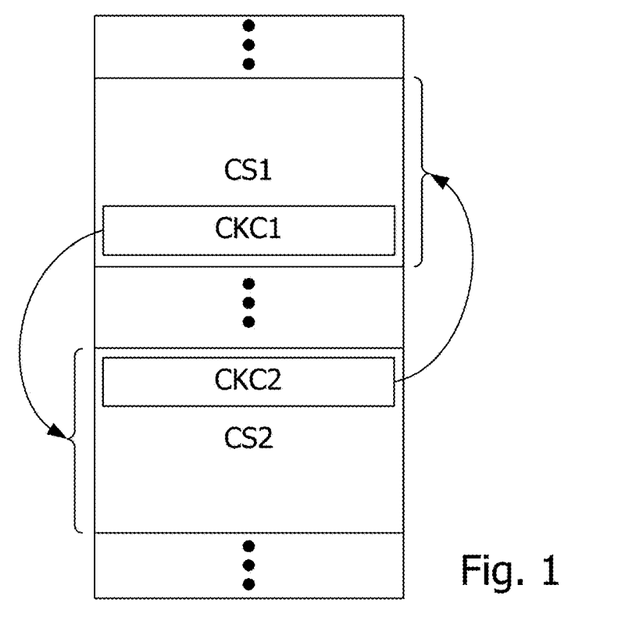
FIG. 1 is a block diagram of a program code portion, showing two code sections, and checking procedures between these code sections.

FIG. 1 shows an executable code portion of an application. The code portion comprises two code sections CS1, CS2. Each code section CS1, CS2 comprises a checking code section CKC1, CKC2 that checks integrity of another code section. Here integrity checking is performed by each checking code section CKC1, CKC2 for example by computing a check value (checksum or hash or signature) from the binary code in the checked code section CS1, CS2, and comparing the computed value with an expected reference value that is stored for example in the checking code section or in a table, the checking code section storing a row number in that table.

In the example of FIG. 1, the code section CKC1 checks the code section CS2, and the code section CKC2 checks the code section CS1. In this manner, the integrity of both code sections CS1, CS2 can be checked. However since the code sections CS1, CS2 check each other, the reference values cannot be stored in these code sections since they would affect the values of the checksums computed from these code sections.

Figure 2:
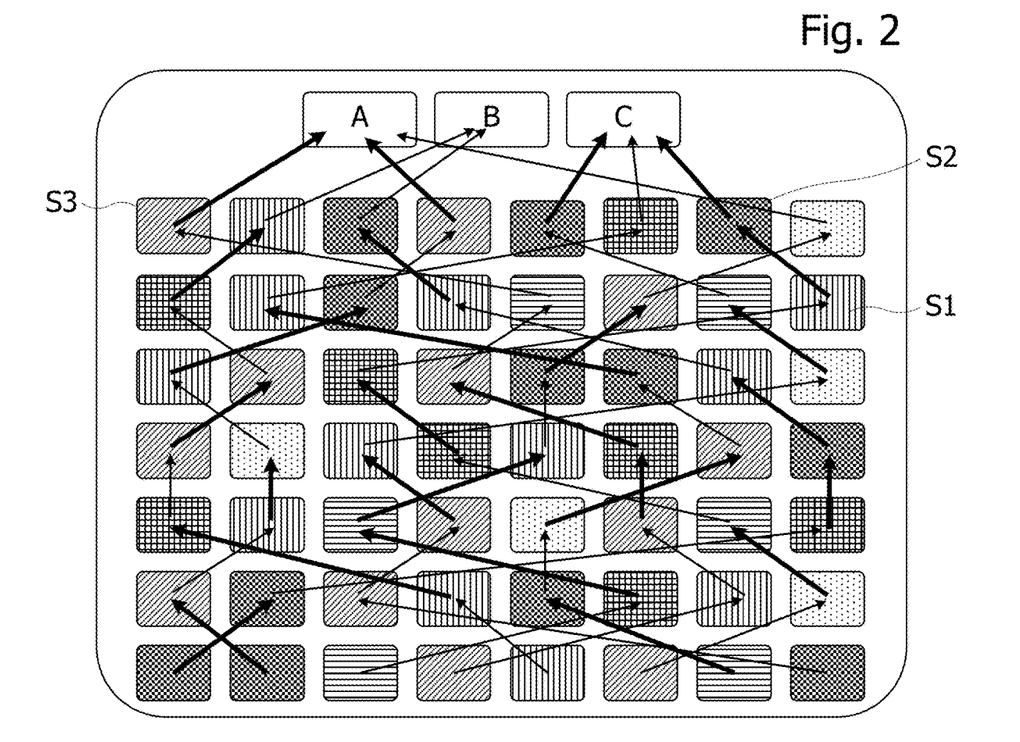
FIG. 2 is a block diagram of a program code divided into a plurality of code sections, and checking procedures between the code segments.

FIG. 2 shows an executable software application code which is divided into a plurality of code segments comprising root code segments A, B and C and a plurality of other code segments e.g. S1, S2, S3, linked together in sequences of code segments including one of the root code segments A, B, C. In this embodiment, the application code has been compiled and thus, the positions of the code segments in FIG. 2 represent the distribution of the code segments throughout the compiled application code. For example, the root code segments A, B, C define attributes of proper use of the application, which have been specified by the developer. These attributes may include, for example: limitations imposed on the use of the application or checks that are to be performed by the application such as checking that the user of the application has purchased a full version of the application, or has a license to use the application. The code segments in FIG. 2 are shown with different shading representing a method that is used to disguise presence of the checking code within the application code. FIG. 2 also represents arrows between code segments. Each arrow is linking an originating code segment to a target code segment which is sequentially adjacent to the originating code segment in a checking direction within the code segment sequences. Each arrow represents a checking process that is employed by the integrity checking code section of the originating code segment to check integrity of the target code segment. For example, the target code segment of code segment S1 is code segment S2, the target code segment of segment S2 is root segment C, and the target code segment of code segment S3 is root code segment A. The thickness of the arrow represents the type of checking process that is employed by the integrity checking code section of the originating code segment to check the integrity of the target code segment. Thus, in the example of FIG. 2, two types of checking processes are employed. These may be, for example, a cyclic redundancy check operable to obtain a checksum (or a hash or signature function operable to obtain a hash value or signature) applied to a defined area of the target code segment to obtain a runtime check result, or some other sort of checksum or other checking method. The runtime check result is compared by the checking process to an expected reference result stored in or accessible to the originating code section.

Generally, the reference results of the code sections of an application are computed during compilation of the source code of the application, when the executable code of the application is generated. For example, the reference result for root code segment C is obtained by performing the checking procedure of code segment S2 applied to its target code segment, namely root code segment C. This involves carrying out for example a cyclic redundancy check, hash or signature computation, on a predetermined portion of memory where root code segment C is stored. The implementation checking procedure is carried out on a predefined area of memory where is stored root code segment C, the code segment S2 receiving the reference result of root code segment C or an attribute specifying where is stored this reference result. At runtime, the integrity checking code section of code segment S2 is operable to carry out a runtime checking procedure on part of memory storing root code segment C to compute a runtime result, and is then further operable to compare this runtime result with the reference result stored by code segment S2. The integrity of root code segment C is verified according to this comparison, which may require the runtime result to be equal to the reference result or related thereto by some predetermined relationship.

Similarly, the reference result for code segment S2 is obtained by performing the checking procedure of code segment S1, which is applied to the target code segment S2. The code segment S1 receives the reference result of code segment S2 or an attribute specifying where is stored this reference result. Thus, the reference result for the code segment S2 is dependent upon the reference result for root code segment C. At runtime, the integrity checking code section of code segment S1 will be operable to perform a checking procedure on the defined part of the memory of code segment S2 in order to obtain a runtime check result, and will be further operable to compare this runtime check result with the reference result associated therewith. The reference result computation process is performed from each root code segment to a last segment of each code segment sequence of the executable code, until the reference result for each of the code segments is derived and stored.

Figure 3:
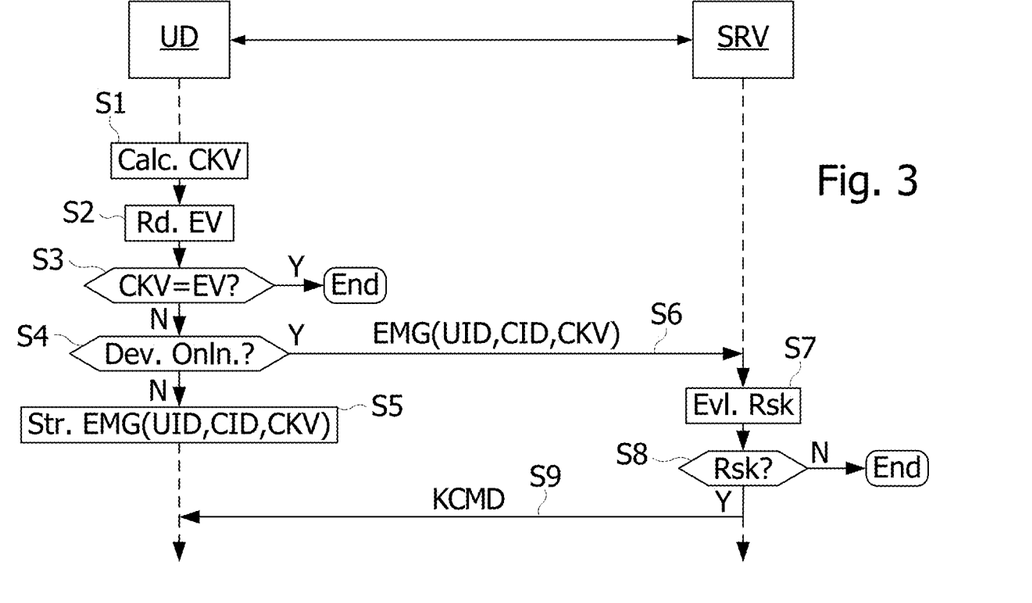
FIGS. 3 and 4 are flow charts of an integrity checking procedure, according to various embodiments.

FIG. 3 shows steps S1 to S9 of an integrity checking procedure, according to an embodiment. This checking procedure is included in an originating code segment of an application executed by a user device UD. In step S1, the checking procedure computes a runtime result CKV on a part of the memory where is stored a target code segment of the application. In step S2, the checking procedure reads a reference result EV of the target code segment. In step S3, the checking procedure compares the runtime result CKV to the reference result EV. If these results correspond to each other (are equal or linked together by a predetermined relationship), the checking procedure ends, otherwise step S4 is carried out. In step S4, the checking procedure determines whether the user device UD is online (connected to a network) and a predetermined server SRV is accessible through this network. The server can provide back-end services related to the application to all user devices executing an instance of the application. In step S5 which is carried out when the user device UD cannot connect to the server SRV, an error message EMG is stored in memory, in view of being later transmitted to the server SRV when the user device can have access to the latter, and the checking procedure ends. The error message EMG can contain an identifier UID of the user or user device, the computed runtime result CKV and an identifier CID of the target code segment. The error message can be stored in a protected memory section, which can be later queried by the server SRV when the user device is online, this section being protected against tampering.

In step S6 which is carried out when the user device UD is connected to the server SRV, the checking procedure transmits the error message EMG containing the computed runtime check result CKV, the identifier CID of the target code segment and the user (or user device) identifier UID, to the server SRV. In step S7, the server SRV receives and processes the error message EMG. Processing the error message may include storing the data contained in the message in a user database, and determining from the data in the user database if the runtime check result can correspond to a reference result of a genuine version of the application. For example, this process can consider that a reception of an isolated error is due to tamper detection, whereas extensive error reporting (from multiple users of the application) containing the same runtime check results reveals release of a new genuine version of the application executable code. In step S8, if the received error message EMG contains a runtime check result corresponding to a genuine version of the application, the procedure ends, otherwise the server SRV transmits to the user device UD a command KCMD to stop execution of the application by the user device or to prevent the application executed by the user device from performing sensitive operations provided by the application (step S9). The transmission of this command may be delayed for a predetermined time to wait for reception of other related error messages from other users containing the same runtime check results. The command KCMD can be sent by the server SRV to the user device UD at the expiration of this predetermined time when no similar error messages are received from other user devices and when the user device UD is online and/or connects to the server. It should be observed that many applications require access to back-end services provided by a server. Thus the execution of some operations of the application requiring such back-end services can be stopped if the server SRV determines that the application has been tampered with.

The implementation of a server receiving integrity check errors from users of an application, enables a distinction to be made between an attack on the application which is necessarily isolated, and a recompilation of the application by a trusted third party, the recompiled application being generally provided to all users of the application by means of an official updating channel. In the case of an authorized recompilation, the server SRV receives from many different users many integrity check error messages containing the same runtime check results. In the case of an attack, the runtime check results received by the server SRV are transmitted by a single user or a very small number of users. In this manner, the integrity checking procedure of FIG. 3 does not prevent a recompiled application from being executed when the recompilation is performed by a trusted third party.

Figure 4:
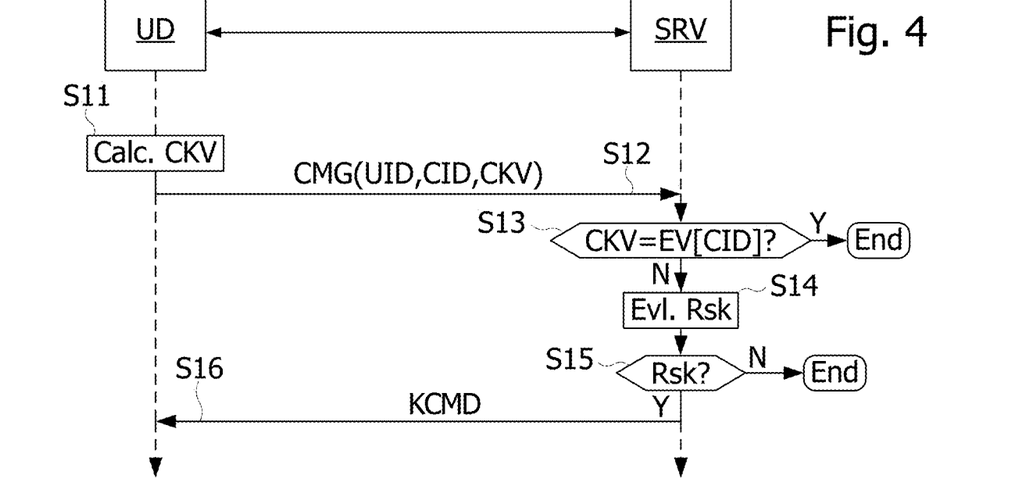

FIG. 4 shows steps S11 to S16 of an integrity checking procedure, according to another embodiment. In this embodiment, the user device UD is online and no comparison is performed by the checking procedures within the application. The application simply notifies each runtime check result to the server SRV, and the server performs the comparisons on the basis of previous data received from instances of the application executed by other user devices. Step S11 can be the same as step S1. In step S12, the checking procedure transmits a control message CMG containing a runtime result CKV computed on a target code segment of the application in step S11, the identifier CID of the target code segment and the user (or user device) identifier UID. In step S13, the server SRV receives and processes the control message CMG. Processing the control message CMG may include storing the data contained in the message in the user database, and determining if the runtime check result CKV can correspond to a reference result EV of an identified genuine version of the application. Steps S14, S15 and S16 following the execution of step S13 may be the same as steps S7 to S9.

Figure 5:
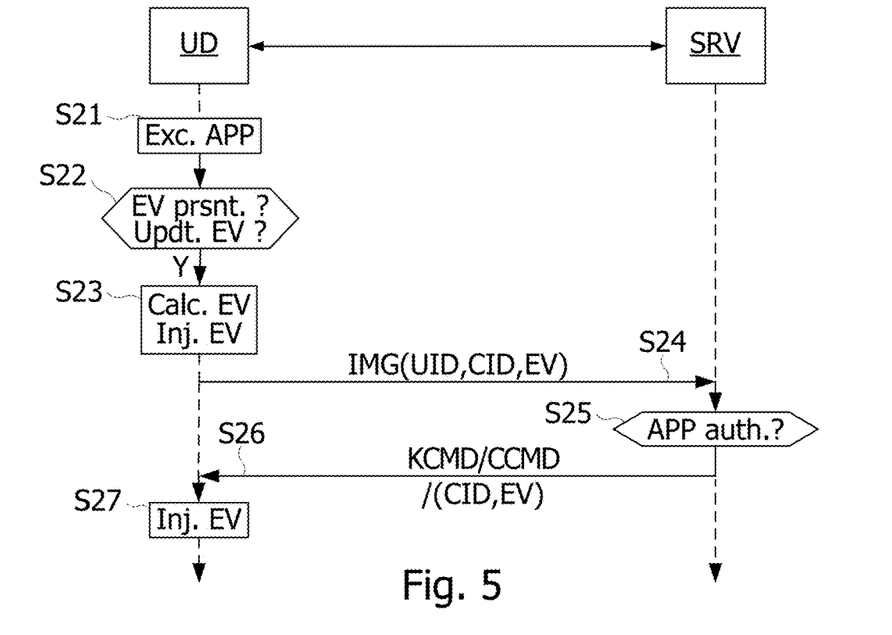
FIG. 5 is a flow chart of an initialization procedure, according to an embodiment.

FIG. 5 shows steps S21 to S27 of a part of an initialization procedure of the application, according to an embodiment. This initialization procedure is executed the first time the application runs and may be executed other times, periodically or not, when the execution of the application is launched. The first time the application is executed, the reference results stored in the application code are dummy or blank values. In step S21, the execution of the application is launched. In step S22, the initialization procedure determines whether the reference results EV are present in the application, or else whether updating of the reference results is requested. Steps S23 to S27 are carried out when the reference results need to be injected (or reinjected) into the application executable code. In step S23, the initialization procedure computes all the reference results to be injected into the code segments of the application, and insert the computed results into them. In step S24, the computed reference results EV are transmitted to the server SRV, in a message IMG that also contains the identifiers CID of the corresponding code segments and the user identifier UID. In step S25, the server SRV receives and stores the content of the message IMG in a user database. The server SRV also verifies whether the received reference results EV correspond to those of a genuine version of the application. As previously disclosed, reference results EV can be considered as related to a genuine version of the application when the server receives the same reference results from a large number of different users.

In step S26, performed when the received reference results EV do not correspond to those of a genuine version of the application, the server SRV transmits a kill command KCMD to the user device to stop the execution of the application by the user device UD, and/or transmits reference results EV of a genuine version of the application associated with the corresponding identifiers CID of the code segments of the application. In step S27, the user device UD receives the message from the server SRV. If the received message is a kill command the application stops. If reference results EV are transmitted, the application injects the received reference results into the corresponding code segments of the application executable code. In this manner, if the application instance executed by the user device UD is a tampered version, at least some of the injected reference values do not correspond to the runtime check results computed by the integrity checking code sections of the application, and at least some of the operations performed by the application are prevented from being carried out. When the application includes the initialization procedure performing steps S21 to S27, the integrity check code sections of the application can implement steps S1 to S5 of FIG. 3.

According to another embodiment, the reference results EV computed in step S23 can alternately be requested by the user device UD to the server SRV and transmitted by the latter. In this case, the reference results do not need to be transmitted to the server in step S24. In addition, steps S25 and S26 do not need to be executed, provided that if the application executed by the user device UD has been tampered with, some of the integrity checks performed by the application would provide a runtime result that does not correspond to the corresponding reference result supplied by the server SRV.

According to an embodiment, steps S7 and S14 are implemented by the server SRV by grouping the data in the messages EMG, CMG received from the user devices executing an instance of the application, to form result sets of integrity check results for each user device, and hence for each instance of the application. Here, each user device is considered as executing a single instance of the application. Then, the server SRV compares the result sets to identify all different result sets and determine an occurrence number for each identified different result set. Each identified different result set corresponds to a respective version of the application that may have instances installed on different user devices. A threshold value is fixed to decide whether an application version is genuine. If the occurrence number of one identified different result set exceeds the threshold value, after a given time from the first reception of the identified different result set, the server SRV decides that the application version corresponding to this identified different result set is genuine. It should be observed that a genuine version of an application is supposed to be deployed on many user devices rapidly, as being supplied by a widely used transmission channel, whereas a fake version of the application can only be deployed slowly on a very small number of user devices.

Sensitive code sections of the application can be implemented using white-box cryptography to make those sections very difficult to be analyzed and modified by hackers, thereby preventing sensitive code section and data of an application from being easily retrieved, analyzed and modified. These code sections can include the initialization procedure (FIG. 5), the integrity checking code sections, the code sections transmitting and storing messages to the server SRV, and the code sections receiving and processing the messages from the server. In addition, the messages from the server SRV can be encrypted and/or signed, e.g. using a private key of the server, the signatures of the received messages being verified by the message receiving code sections of the application executed by the user device, using a public key corresponding to the private key of the server. In this manner, the application only processes authenticated messages from the server. The messages transmitted by the server SRV can include a timestamp and/or a random number to prevent a replay attack using an old message from the server.

Figure 6:
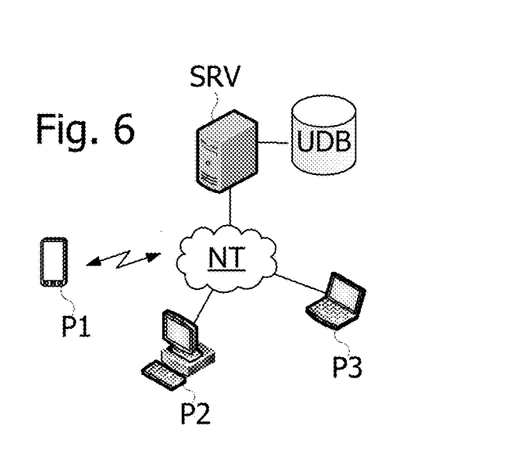
FIG. 6 is a block diagram of user devices executing an application and a remote server controlling execution of the application by the user devices, according to an embodiment.

FIG. 6 illustrates user devices P1, P2, P3 that can execute different instances of a same application, and the server SRV that controls execution of the application by the user devices. The user devices P1, P2, P3 and the server SRV are connected to communication networks NT such as the Internet. The server SRV manages a user database UDB storing a set of references values EV for each known genuine version of the application. The database UDB can also store links between user identifiers UID and application instance identifiers. In this manner, when the server SRV receives a user identifier UID, it can determine which set of reference results to use to verify a runtime check result.

The user devices P1, P2, P3 can be for instance a mobile phone, a smartphone, a personal computer, a digital tablet or any equipment including or associated with communication and possibly display functionalities, that can execute a program application. The communications networks NT may include Internet Protocol networks, such as the Internet, mobile or cellular networks, wireless networks, and any kind of network that can be used to establish a communication link between a user device and a remote server.

Figure 7:
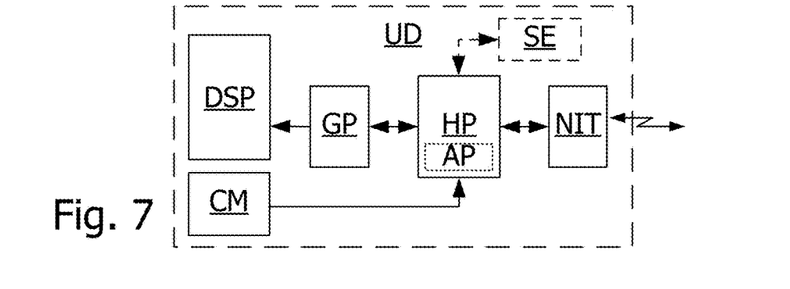
FIG. 7 is a block diagram of an example of conventional user device.

FIG. 7 illustrates a conventional user device UD for executing software applications in connection with a remote server. The device UD can be a cellular phone, a smartphone or a PDA (Personal Digital Assistant) or any other device such as a digital tablet or a personal computer including communication circuits to be connected to a network such as Internet network. The user device UD comprises a processor HP (also called "Central Processing Unit"—CPU) executing an application AP, communication circuits NIT for communicating with a remote server such as the server SRV, through a transmission network such as the network NT. The processor HP is connected to the communication circuits NIT. The user device UD may further comprise a display screen DSP, a graphic processor GP connected to the processor HP and controlling the display screen DSP, and a control device CM connected to the processor HP. The control device CM can include a keyboard or keypad, or a touch-sensitive surface, e.g. transparent and disposed on the display screen DSP. The control device CM can further include a pointing device such as a mouse, a pencil or a pen.

The user device UD can further comprise a secure element SE, such as a secure processor that can be standalone or embedded into a smartcard UICC. The secure processor SE can be for example a SIM ("Subscriber Identity Module") card, or a USIM ("Universal Subscriber Identity Module"), providing an access to a cellular network. The secure processor SE can include an NFC ("Near Field Communication") circuit to communicate with a contactless reader. The NFC circuit can be embedded into a SIM card (SIM-NFC) or a UICC card, or into a SoC ("System on Chip") circuit, or in an external memory card, for example a SD ("Secure Digital") card. The circuits NIT can include a mobile telecommunication circuit giving access to a mobile cellular network and/or to the Internet network, through the cellular network, and/or a wireless communication circuit (Wi-Fi, Bluetooth™, or any other radio frequency or wireless communication methodology), and/or any other wired or wireless connection circuit that can be linked to a data transmission network such as Internet.

In all embodiments previously disclosed, the user device UD can comprise an embedded protected memory to be used to store the runtime check results CKV, and/or the expected reference results EV received from the server SRV, to be used offline. The protected enclave can also be used to store the error messages EMG in view of being queried later by the server SRV when the user device is online. The communication link between the user device and the protected enclaved can be secured using e.g. encryption based on a secret key only known by a protected (e.g. white-box) part of the application.

According to embodiments, steps S6, S12 and S13 are partially performed by the secure element SE connected to and/or embedded in the user device UD. The secure element SE comprises communication circuits for establishing a secure (encrypted) link with the application AP executed by the processor HP and with a trusted server such as the server SRV.

According to an embodiment, the error message EMG generated in step S6 is first transmitted by the processor HP to the secure element SE through the secure link to be stored in a protected memory of the secure element. When the user device UD and in particular the secure element is online, the secure element SE establishes with the server SRV a secure (encrypted) communication link, and transmits all messages EMG that could have been previously received and stored. After successful transmission of the messages EMG to the server SRV, the secure element SE deletes the stored messages.

According to another embodiment, the secure element SE is configured to receive through a secure link established with the server SRV all the reference results EV that are needed by the application APP to perform the runtime integrity checks injected into the application. For example, in step S12, when the user device is offline, the control messages CMG are transmitted to the secure element SE, for example through a secure link established with the processor HP. The comparison performed in step S13 is carried out by the secure element SE which generate an error message when a received runtime integrity check result CKV[CID] for an integrity check CID does not correspond to the corresponding reference result EV[CID], the error message being later transmitted to the server SRV when the user device UD is online.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments or combinations thereof may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

The invention claimed is:

1. A method of protecting a software program against tampering, the method comprising:
    dividing an executable code of the software program in code segments, each including an integrity check code section;
    executing, by a processor of a user device, the executable code of the software program, wherein the execution of the integrity check code section of one of the code segments configures the processor to:
        compute an integrity check result applied to a corresponding distinct code segment of the executable code; and
        transmit to a server a message containing the integrity check result and an identifier of the corresponding code segment; and
    in the server, comparing the integrity check result to a reference result assigned to the code segment identifier and, when the comparison fails, issuing to the user device a signal that prevents an operation of the software program from being executed by the processor.

2. The method of claim 1, further comprising comparing, by the processor, the integrity check result with a reference result stored in the user device for the corresponding code segment, the message being transmitted to the server only when the integrity check result does not correspond to the reference result stored in the user device for the corresponding code segment.

3. The method of claim 2, further comprising preventing, by the processor, an operation of the software program from being executed when the integrity check result does not correspond to the reference result stored for the corresponding code segment.

4. The method of claim 2, wherein the reference result is received by the user device and inserted, by the processor, into the executable code when the executable code is executed by the processor at a first time.

5. The method of claim 2, wherein the reference result is computed and inserted into the executable code when the executable code of the software program is generated.

6. The method of claim 1, wherein the code segments are grouped together into sequences of code segments, each sequence comprising links between code segments, a root code segment and a last code segment, each link linking an originating code segment to a target code segment of the sequence, each link corresponding to an integrity check code section in the originating code segment of the link, which verifies integrity of the target code segment of the link.

7. The method of claim 1, further comprising:
    receiving, by the server from other user devices, messages containing an integrity check result associated with an identifier of a code segment of the software program and an identifier of the user device;
    forming, by the server, result sets of integrity check results of instances of the software program, by grouping messages received from a same user device, each user device being considered as executing a single instance of the software program;
    counting, by the server, occurrence numbers of identified different results sets among the result sets, each identified different result set corresponding to a respective version of the software program; and
    deciding that one of the versions of the software program executed by a user device is genuine when the identified different result set corresponding to the version of the software program has an occurrence number exceeding a given threshold value after a given time from a first reception, by the server, of the identified different result set.

8. A device comprising a processor, a memory and communication circuits for connecting the processor to a remote server, the processor being configured to execute an executable code of a software program, the executable code comprising code segments, each including an integrity check code section,
    the execution of the integrity check code section of one of the code segments by the processor configuring the processor to:
    compute an integrity check result applied to a corresponding distinct code segment of the executable code;
    transmit to a server a message containing the integrity check result and an identifier of the corresponding code segment; and
    wherein the server is configured to compare the integrity check result to a reference result assigned to the code segment identifier and, when the comparison fails, issue to the device a signal that prevents an operation of the software program from being executed by the processor.

9. The device of claim 8, wherein the device is further configured to compare, by the processor, the integrity check result with a reference result stored in the device for the corresponding code segment, the message being transmitted to the server only when the integrity check result does not correspond to the reference result stored in the device for the corresponding code segment.

10. The device of claim 9, wherein the device is further configured to prevent, by the processor, an operation of the software program from being executed when the integrity check result does not correspond to the reference result stored for the code segment.

11. The device of claim 9, wherein the reference result is received by the device and inserted, by the processor, into the executable code when the executable code is executed by the processor at a first time.

12. The device of claim 9, wherein the reference result is computed and inserted into the executable code when the executable code of the software program is generated.

13. The device of claim 8, wherein the code segments are grouped together into sequences of code segments, each sequence comprising links between code segments, a root code segment and a last code segment, each link linking an originating code segment to a target code segment of the sequence, each link corresponding to an integrity check code section in the originating code segment of the link, which verifies integrity of the target code segment of the link.

14. The device of claim 8, further comprising a protected memory area configured to receive the message when the device is not connected to the server.

15. The device of claim 8, further comprising a secure element configured to:
    establish secure links with the processor and with the remote server;
    receive and store the message from the processor; and
    transmit the message to the server upon request thereof.

16. The device of claim 8, further comprising a secure element configured to:
    establish secure links with the processor and with the remote server;
    receive and store the reference results of the software program from the server;
    receive comparison requests from the processor;
    subsequent to receiving a comparison request, compare an integrity check result of a code segment, received in the comparison request, with one of the reference results stored by the secure element and corresponding to the code segment, and transmit to the processor a comparison result of the comparison; or transmit to the processor the reference result requested in the comparison request;
    generate and store a message containing the integrity check result; and
    receive requests from the remote server, and subsequent to receiving a request from the remote server, transmit the message to the server.

17. A non-transitory computer-readable medium having a software program stored thereon, the software program, when executed by a computer, causes the computer to:
    divide an executable code of the software program in code segments, each comprising an integrity check code sections;
    during execution of the integrity check code sections of one of the executable code segments, compute an integrity check result applied to a corresponding distinct code segment of the executable code;
    transmit, to a server, a message containing the integrity check result and an identifier of the corresponding code segment, wherein the server is configured to compare the integrity check result to a reference result assigned to the code segment identifier and, when the comparison fails, issue a signal; and
    receive the signal from the server, the signal preventing an operation of the software program from being executed by the computer.

18. The non-transitory computer-readable medium of claim 17, wherein the software program, when executed by the computer, further causes the computer to:
    compare the integrity check result with a reference result stored in the computer for the corresponding code segment, the message being transmitted to the server only when the integrity check result does not correspond to the reference result stored in the computer for the corresponding code segment.

19. The non-transitory computer-readable medium of claim 18, wherein the software program, when executed by the computer, further cause the computer to:
    prevent an operation of the software program from being executed when the integrity check result does not correspond to the reference result stored for the code segment.

20. The non-transitory computer-readable medium of claim 18, wherein the reference result is received by the computer and inserted into the executable code when the executable code is executed by the computer a first time.

21. The non-transitory computer-readable medium of claim 18, wherein the reference result is computed and inserted into the executable code when the executable code of the software program is generated.

22. The non-transitory computer-readable medium of claim 17, wherein the code segments are grouped together into sequences of code segments, each sequence comprising links between code segments, a root code segment and a last code segment, each link linking an originating code segment to a target code segment of the sequence, each link corresponding to an integrity check code section in the originating code segment of the link, which verifies integrity of the target code segment of the link.

* * * * *